US011922936B2

(12) United States Patent
Lee

(10) Patent No.: US 11,922,936 B2
(45) Date of Patent: Mar. 5, 2024

(54) HOME APPLIANCE AND OPERATING METHOD THEREOF

(71) Applicant: LG ELECTRONICS INC., Seoul (KR)

(72) Inventor: Kiwoong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 270 days.

(21) Appl. No.: 17/347,168

(22) Filed: Jun. 14, 2021

(65) Prior Publication Data

US 2021/0398531 A1  Dec. 23, 2021

(30) Foreign Application Priority Data

Jun. 18, 2020  (KR) .................. 10-2020-0074312

(51) Int. Cl.
*G10L 15/22* (2006.01)
*G10L 15/08* (2006.01)
*G10L 15/18* (2013.01)

(52) U.S. Cl.
CPC ............ *G10L 15/22* (2013.01); *G10L 15/083* (2013.01); *G10L 15/18* (2013.01); *G10L 2015/088* (2013.01); *G10L 2015/223* (2013.01)

(58) Field of Classification Search
CPC ....... G10L 15/22; G10L 15/063; G10L 15/08; G10L 15/083; G10L 15/085; G10L 15/18;
(Continued)

(56) References Cited

U.S. PATENT DOCUMENTS 5,598,522 A    1/1997  Inatomi
2010/0036831 A1*  2/2010  Vemuri ............ G06F 16/24568
                                                                  707/718
(Continued)

FOREIGN PATENT DOCUMENTS

EP    3113139    1/2017

OTHER PUBLICATIONS

European Patent Office Application Serial No. 21180046.1, Search Report dated Nov. 10, 2021, 7 pages.

*Primary Examiner* — Qi Han
(74) *Attorney, Agent, or Firm* — LEE, HONG, DEGERMAN, KANG & WAIMEY

(57) ABSTRACT

The present disclosure relates to a home appliance and an operating method thereof. The home appliance according to the present disclosure includes: a user input interface; a storage configured to store a database of a response history, and a controller configured to: in response to receiving an input requesting to perform a previous operation through the user input interface, verify whether a first operation, corresponding to the request for performing the previous operation, is present in the operation history; in response to there being the first operation, verify a type of a first command, mapped to the first operation, among commands included in the database; in response to the type of the first command being a first type, determine the first operation to be the previous operation; and in response to the type of the first command being a second type, generate a second operation corresponding to the first command, and determines the second operation to be the previous operation. Various other embodiments are also possible.

14 Claims, 14 Drawing Sheets

(58) Field of Classification Search
CPC ......... G10L 15/20; G10L 15/24; G10L 15/26; G10L 2015/0631–0638; G10L 2015/221–228
USPC ................ 704/270.1, 270, 275, 276, 257
See application file for complete search history.

(56) References Cited

U.S. PATENT DOCUMENTS

| | | |
|---|---|---|
| 2014/0285325 A1 | 9/2014 | Umetani et al. |
| 2018/0165580 A1* | 6/2018 | Boyer ..................... G06F 16/00 |
| 2019/0347118 A1* | 11/2019 | Mukherjee .......... G06F 9/45512 |

* cited by examiner

HOME APPLIANCE AND OPERATING METHOD THEREOF

CROSS-REFERENCE TO RELATED APPLICATION

Pursuant to 35 U.S.C. § 119(a), this application claims the benefit of earlier filing date and right of priority to Korean Patent Application No. 10-2020-0074312, filed on Jun. 18, 2020, the contents of which are hereby incorporated by reference herein in its entirety.

BACKGROUND OF THE DISCLOSURE

Field of the disclosure

The present disclosure relates to a home appliance and an operating method thereof.

Related Art

Home appliances are devices used for user convenience. The home appliances, such as an image display device, an air conditioner, a washing machine, a refrigerator, etc., which are used in specific spaces at home or office, perform their unique functions and operations by a user's manipulation.

Generally, the home appliance provides a convenient function of re-executing a previously performed operation (hereinafter referred to as a previous operation function) by a user's input. For example, when a user presses a specific button (e.g., previous channel button) on the remote control while watching broadcast content on TV, the TV may reselect a channel which is selected immediately before the current channel is selected, and may output the broadcast content of the reselected channel.

Further, when providing the previous operation function, the home appliance may store therein a history of operations performed in response to commands input by a user; and upon receiving an input for re-executing previous operations, the home appliance may sequentially perform operations again, starting from the most recently performed operation, based on the history stored therein. However, the existing home appliance provides the previous operation function by merely using data stored in the history as it is, thereby causing a problem in that a result of the previous operation performed based on the history may be different from a result of an operation desired by a user. For example, in the case where a user sequentially checks the indoor temperature and outdoor temperature on the air conditioner, and then requests to execute the previous operation function after lapse of a predetermined period of time, a problem may occur in that the user needs the current indoor temperature at a time after the predetermined period of time has elapsed, but the air conditioner provides the user with information on the indoor temperature confirmed previously and stored in the history as it is.

Further, when using the previous operation function, the user generally expects re-execution of previous operations performed while the home appliance is used continuously, rather than operations at a previous time unexpected to the user. However, the existing home appliance simply accumulates data on the previous operations in the history, such that when the user uses the previous operation function, it may be possible that operations at a previous time unexpected to the user may be performed.

SUMMARY

It is an object of the present disclosure to solve the above and other problems.

It is another object of the present disclosure to provide a home appliance and an operating method thereof, in which when providing a previous operation function based on a history stored therein, the home appliance may accurately perform an operation desired by a user by considering a change of time.

In accordance with an aspect of the present disclosure, the above and other objects can be accomplished by providing a home appliance, including: a user input interface; a storage configured to store a database of a response history, wherein in response to receiving an input requesting to perform a previous response through the user input interface, the controller verifies whether a first response, corresponding to the request for the previous response, is present in the response history; in response to there being the first response, the controller verifies a type of a first command mapped to the first response; in response to the type of the first command being a first type, the controller determines the first response to be the previous response; and in response to the type of the first command being a second type, the controller generates a second response corresponding to the first command, and determines the second response to be the previous response.

In accordance with another aspect of the present disclosure, the above and other objects can be accomplished by providing an operating method of a home appliance, the method including: in response to receiving an input requesting a previous response, verifying whether a first response, corresponding to the request for the previous response, is present in a database of a response history; in response to there being the first response, verifying a type of a first command, mapped to the first response, among commands included in the database; in response to the type of the first command being a first type, determining the first response to be the previous response; and in response to the type of the first command being a second type, generating a second response corresponding to the first command, and determining the second response to be the previous response.

According to various embodiments of the present disclosure, when providing a previous operation function based on a history stored in the home appliance, it is possible to determine, according to a type of command stored in the history, whether to use the data stored in the history as it is or to generate a new data, thereby accurately performing a previous operation desired by a user.

In addition, according to various embodiments of the present disclosure, when the same type input is received, an operation performed by the home appliance is added to the history and the history is updated, and when a different type input is received, the history is initialized, thereby preventing re-execution of a previous operation which is unexpected to a user.

The additional range of applicability of the present disclosure will become apparent from the following detailed description. However, because various changes and modifications will be clearly understood by those skilled in the art within the spirit and scope of the present disclosure, it should be understood that the detailed description and specific embodiments such as preferred embodiments of the present disclosure are merely given by way of example.

DETAILED DESCRIPTION OF EXEMPLARY EMBODIMENTS

Figure 1:
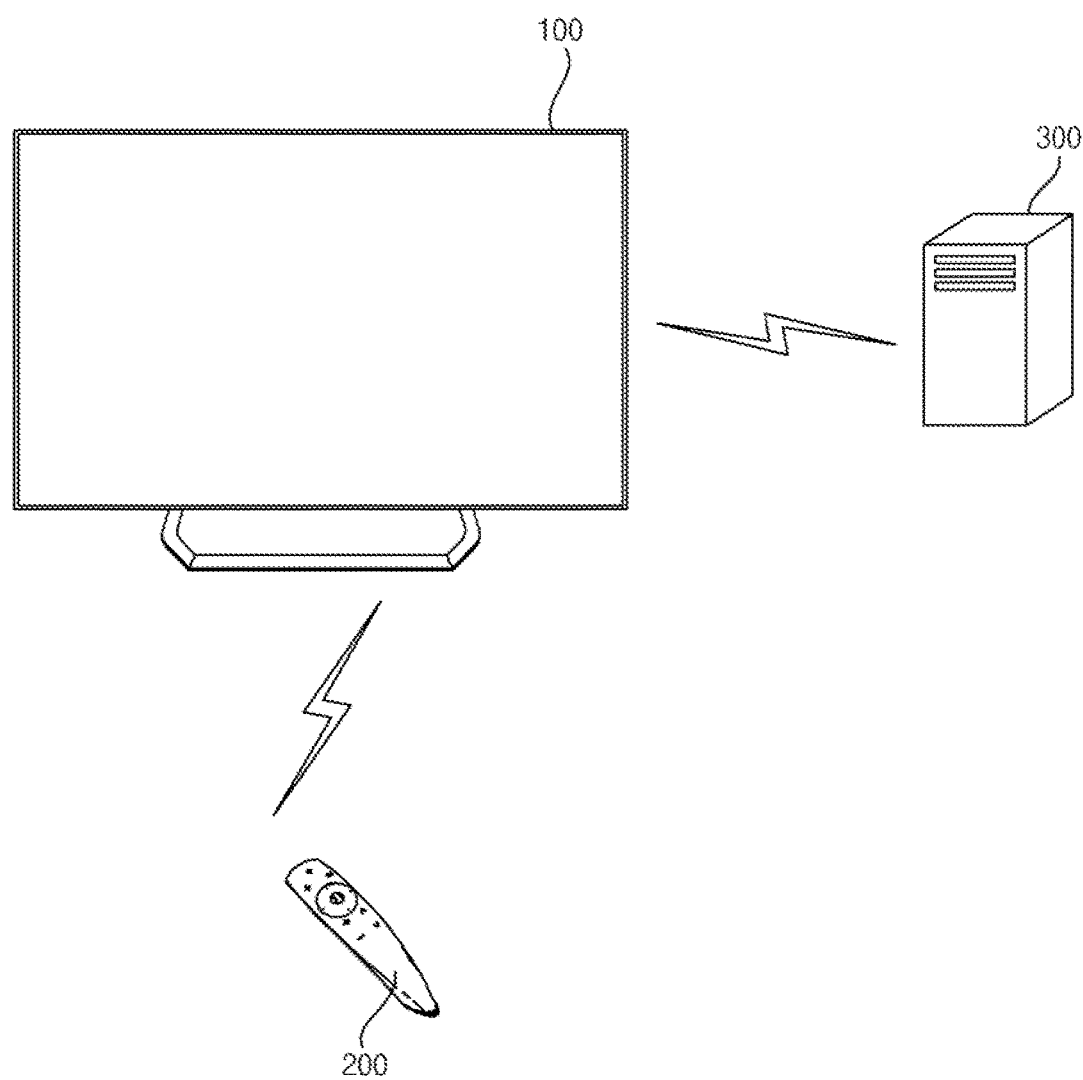
FIG. 1 is a diagram illustrating a system according to various embodiments of the present disclosure.

Reference will now be made in detail to the embodiments of the present disclosure, examples of which are illustrated in the accompanying drawings. To clearly and briefly describe the present disclosure, a part irrelevant to the description will be omitted in the drawings, and the same or like reference numerals in the specification denote the same elements.

The suffixes "module" and "unit" of elements herein are used for convenience of description and thus can be used interchangeably and do not have any distinguishable meanings or functions. Thus, the "module" and the "unit" may be interchangeably used.

It should be understood that the terms "comprise", "include", "have", etc. when used in this specification, specify the presence of stated features, integers, steps, operations, elements, components, or combinations of them but do not preclude the presence or addition of one or more other features, integers, steps, operations, elements, components, or combinations thereof.

It will be understood that, although the terms "first", "second", etc. may be used herein to describe various elements, these elements should not be limited by these terms. These terms are only used to distinguish one element from another element.

FIG. 1 is a diagram illustrating a system according to various embodiments of the present disclosure.

Referring to FIG. 1, a system 10 may include a home appliance 100, a remote control device 200, and/or a server 300.

According to various embodiments of the present disclosure, the home appliance, electronic device, electronic equipment, and the like may be used interchangeably. While FIG. 1 illustrates an image display device as an example of the home appliance 100, the present disclosure is not limited thereto, and examples of the home appliance 100 may include various devices such as an air conditioner, an air purifier, a refrigerator, a washing machine, and the like.

The image display device, as an example of the home appliance 100, may be a device for processing an image and outputting the processed image. The home appliance 100, such as a TV, a laptop computer, a monitor, etc., is not particularly limited, as long as the home appliance 100 may output a screen corresponding to an image signal.

The remote control device 200 may be connected by wire and/or wirelessly to the home appliance 100, to provide various control signals to the home appliance 100. In this case, the remote control device 200 may include a device for establishing a wired or wireless network with the home appliance 100, to transmit various control signals to the home appliance 100 or to receive from the home appliance 100 signals, related to various operations processed by the home appliance 100, through the established network.

For example, various input devices, such as a mouse, a keyboard, a space remote controller, a trackball, a joystick, etc., may be used as the remote control device 200.

The home appliance 100 may be connected to a single remote control device 200, or may be connected simultaneously to two or more remote control devices 200 to operate based on control signals provided from the respective remote control devices 200.

The home appliance 100 may transmit and receive data with the server 300 via a network, such as the Internet.

The server 300 may process data received from the home appliance 100 through the network, and may transmit data on processing results to the home appliance 100. The server 300 may store various data on the home appliance 100.

Figure 2:
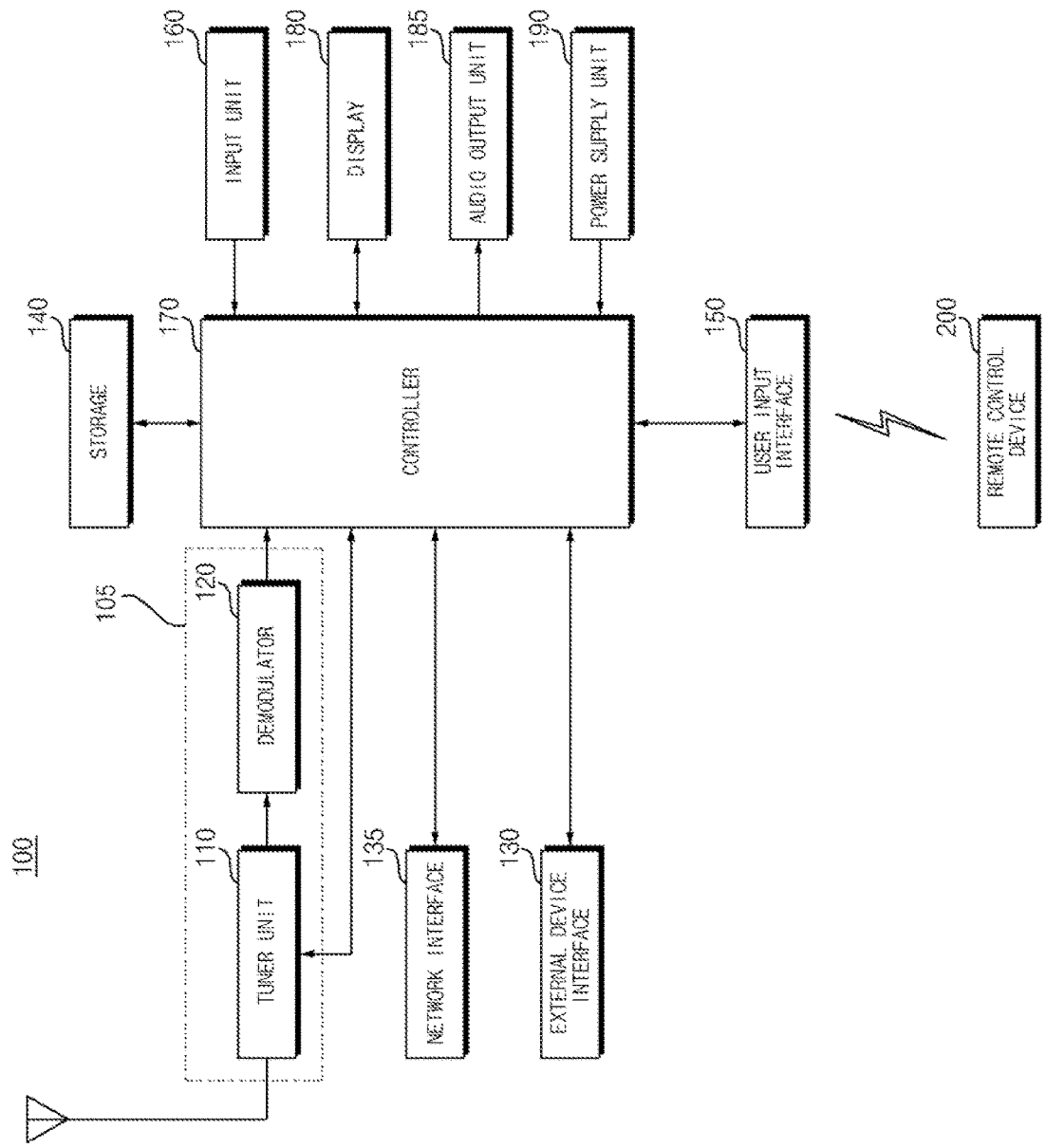
FIG. 2 is an internal block diagram of an image display device of FIG. 1.

FIG. 2 is an internal block diagram of an image display device as an example of the home appliance of FIG. 1. The home appliance 100 according to various embodiments of the present disclosure may include all or part of the components illustrated in FIG. 2, and may further include components according to each of unique functions and operations of the home appliance 100.

Referring to FIG. 2, the image display device as an example of the home appliance 100 may include a broadcast receiver 105, an external device interface 130, a network interface 135, a storage 140, a user input interface 150, an input unit 160, a controller 170, a display 180, an audio output unit 185, and/or a power supply unit 190.

The broadcast receiver 105 may include a tuner 110 and a demodulator 120.

The tuner 110 may select a broadcast signal corresponding to a channel selected by a user or broadcast signals corresponding to all prestored channels from among broadcast signals received through an antenna (not shown) or a cable (not shown). The tuner 110 may convert a selected broadcast signal into an intermediate frequency (IF) signal or a baseband video or audio signal.

For example, if the selected broadcast signal is a digital broadcast signal, the tuner 110 may convert the selected broadcast signal into a digital IF signal (DIF), and if the selected broadcast signal is an analog broadcast signal, the tuner 100 may convert the selected broadcast signal into an analog baseband video or audio signal CVBS/SIF. That is, the tuner 110 may process digital broadcast signals or analog broadcast signals. The analog baseband video or audio signal CVBS/SIF output from the tuner 110 may be directly input to the controller 170.

In addition, the tuner 110 may sequentially select broadcast signals of all the broadcast channels stored through a channel memory function from among the received broadcast signals and may convert the selected broadcast signals into IF signals or baseband video or audio signals.

Further, the tuner 110 may include a plurality of tuners for receiving broadcast signals of a plurality of channels. Alternatively, the tuner 110 may be a single tuner that simultaneously receives broadcast signals of a plurality of channels.

The demodulator 120 may receive a digital IF signal DIF converted by the tuner 110 and may demodulate the digital IF signal.

Upon performing demodulation and channel decoding, the demodulator 120 may output a stream signal TS. In this case, the stream signal may be a multiplexed video signal, audio signal or data signal.

The stream signal output from the demodulator 120 may be input to the controller 170. Upon performing demultiplexing, video/audio signal processing, etc., the controller 170 may output an image to the display 180 and may output sound to the audio output unit 185.

The external device interface 130 may transmit or receive data to or from a connected external device. To this end, the external device interface 130 may include an A/V input/output unit (not shown).

The external device interface 130 may be connected by wire or wirelessly to external devices, such as a digital versatile disc (DVD) player, a Blu-ray player, a game console, a camera, a camcorder, a computer (laptop), a set-top box, etc., and may perform input/output operations for external devices.

The A/V input/output unit may receive video and audio signals of an external device. For example, the A/V input/output unit may include an Ethernet terminal, a USB terminal, a composite video banking sync (CVBS) terminal, a component terminal, a S-video terminal (analog), a digital visual interface (DVI) terminal, a high definition multimedia interface (HDMI) terminal, a mobile high-definition link (MHL) terminal, an RGB terminal, a D-SUB terminal, an IEEE 1394 terminal, an SPDIF terminal, a liquid HD terminal, and the like. A digital signal input through such terminals may be transmitted to the controller 170. In this case, an analogue signal input through the CVBS terminal and the S-video terminal may be converted into a digital signal by an analogue/digital conversion unit (not shown), to be transmitted to the controller 170.

The external device interface 130 may include a wireless communicator (not shown) for short-range wireless communication with other electronic devices. Through the wireless communicator, the external device interface 130 may exchange data with an adjacent mobile terminal. For example, the external device interface 130 may receive, from the mobile terminal, device information, running application information, application images, and the like in a mirroring mode.

The external device interface 130 may perform short-range wireless communication by using Bluetooth, Radio Frequency Identification (RFID) communication, infrared Data Association (IrDA) communication, Ultra-Wideband (UWB), ZigBee, and the like.

The network interface 135 may provide an interface for connecting the home appliance 100 to a wired/wireless network including an Internet network.

The network interface 135 may include a communication module (not shown) for communication with the wired/wireless network 400. For example, the network interface 135 may include a communication module for Wireless LAN (WLAN; Wi-Fi), Wireless broadband (Wibro), World Interoperability for Microwave Access (Wimax), High Speed Downlink Packet Access (HSDPA), and the like.

The network interface 135 may transmit or receive data to or from other users or other electronic devices through a connected network or another network linked to the connected network.

The network interface 135 may receive web content or data provided by a content provider or a network operator. That is, the network interface 135 may receive the web content or data, such as movies, advertisements, games, VOD, broadcast signals, etc., as well as information related thereto, which are provided by content providers or network providers through the network.

The network interface 135 may receive update information and an update file of firmware provided by network operators, and may transmit data to internet or content providers or network operators.

The network interface 135 may select a desired application from among a plurality of applications open to the public, and may receive the selected application through a network.

The storage 140 may store programs for processing and controlling each signal within the controller 180, and may store signal-processed video, audio or data signals. For example, the storage 140 may store applications designed to perform various operations which may be processed by the controller 170, and in response to a request from the controller 170, the storage 140 may selectively provide some of the stored applications.

The programs and the like stored in the storage 140 are not particularly limited, as long as the programs may be executed by the controller 170.

The storage 140 may perform the function of temporarily storing video, audio or data signals received from an external device through the external device interface 130.

The storage 140 may store information on predetermined broadcast channels through a channel memory function.

The storage 140 may store a database of a history of operations performed by the home appliance 100 (hereinafter referred to as an operation history). Here, data on the operations performed by the home appliance 100 may be included in the database of the operation history in the order of performed operations.

In this case, each operation included in the database of the operation history may be mapped with a command for performing a corresponding operation and/or a type of the command. Here, the type of a command may include a type in which details and results of an operation corresponding to the command remain unchanged over time (hereinafter referred to as a first type), and a type of a command in which details and results of an operation corresponding to the command vary over time (hereinafter referred to as a second type).

While FIG. 2 illustrates an example in which the storage 140 is provided separately from the controller 170, the scope of the present disclosure is not limited thereto, and the storage 140 may be included in the controller 170.

The storage 140 may include at least one of a volatile memory (e.g., DRAM, SRAM, SDRAM, etc.) and a non-volatile memory (e.g., flash memory, hard disk type memory (HDD), solid-state drive (SSD), etc.). In various embodiments of the present disclosure, the storage 140 and the memory may be used interchangeably.

The user input interface 150 may transmit a signal, input by a user, to the controller 170 or may transmit a signal, input from the controller 170, to the user. For example, the user input interface 150 may transmit/receive a user input signal, such as power on/off, channel selection, screen setup, etc., to/from a remote control device 250, and may deliver a user input signal input through a local key (not shown), such as a power key, a channel key, a volume key, or a setup value, to the controller 170, or may deliver a user input signal, input from a sensor unit (not shown), which senses a user's gesture, to the controller 170, or may transmit a signal from the controller 170 to the sensor unit.

The input unit 160 may be provided on one side of a main body of the home appliance 100. For example, the input unit 160 may include a touchpad, a physical button, and the like.

The input unit 160 may receive various user commands associated with the operation of the home appliance 100, and may transmit a control signal corresponding to the input command to the controller 170. The input unit 160 may transmit a control signal, corresponding to the input command, to the controller 170 to the user input interface 150.

The input unit 160 may include at least one microphone (not shown), and may receive a user's speech through the microphone.

The controller 170 may include at least one processor, and by using the included processor, the controller 170 may control the overall operation of the home appliance 100. Here, the processor may be a general processor such as a central processing unit (CPU). It is also possible that the processor is a dedicated device, such as an ASIC, or other hardware-based processor.

The controller 170 may demultiplex a stream input through the tuner 110, the demodulator 120, the external device interface 130, or the network interface 135, or may process demultiplexed signals to generate and output signals for video or audio output.

The display 180 may convert a video signal, a data signal, an OSD signal, and a control signal processed by the controller 170 or a video signal, a data signal and a control signal received from the external device interface 130 to generate driving signals.

The display 180 may include a display panel (not shown) including a plurality of pixels.

The plurality of pixels included in the display panel may have RGB sub-pixels. Alternatively, the plurality of pixels included in the display panel may have RGBW sub-pixels. The display 180 may convert the video signal, data signal, OSD signal, and control signal processed by the controller 170 to generate signals for driving the plurality of pixels.

The display 180 may be a Plasma Display Panel (PDP), a Liquid Crystal Display (LCD), an Organic Light Emitting Diode (OLED), a flexible display, or the like, and may also be a three-dimensional (3D) display. The 3D display 180 may be divided into an autostereoscopic display and a glasses-type display.

Further, the display 180 may be configured as a touch-screen to be used as an input device in addition to an output device.

The audio output unit 185 receives an audio signal processed by the controller 170, and outputs the audio signal as a sound.

The image signal, processed by the controller 170, may be input to the display 180 to be displayed as an image corresponding thereto. Further, The image signal processed by the controller 170 may be input to an external output device through the external device interface 130.

The audio signal processed by the controller 170 may be output as a sound to the audio output unit 185. Further, the audio signal processed by the controller 170 may be input to an external output device through the external device interface 130.

Although not illustrated in FIG. 2, the controller 170 may include a demultiplexer, a video processor, etc., which will be described later with reference to FIG. 3.

Besides, the controller 170 may control the overall operation of the home appliance 100. For example, the controller 170 may control the tuner 110 to tune in to a broadcast channel selected by a user or a prestored channel.

In addition, the controller 170 may control the home appliance 100 according to a user command input through the user input interface 150 or an internal program.

Further, the controller 170 may control the display 180 to display images. Here, the images displayed on the display 180 may be still images or moving images and may be 2D images or 3D images.

Moreover, the controller 170 may control a predetermined 2D object to be displayed in an image displayed on the display 180. For example, the object may be at least one of an accessed web screen (newspaper, magazine etc.), an electronic program guide (EPG), various menus, a widget, an icon, a still image, a moving image, and text.

In addition, the home appliance 100 may further include an image capturing unit (not shown). The image capturing unit may capture images of a user. The image capturing unit may be implemented with one camera, but is not limited thereto, and may be implemented with a plurality of cameras. Further, the image capturing unit may be embedded in the home appliance 100 on the top of the display 180, or may be provided separately. Image information captured by the image capturing unit may be input to the controller 170.

The controller 170 may recognize a user's position based on the images captured by the image capturing unit. For example, the controller 170 may identify a distance (z-axis coordinates) between the user and the home appliance 100. In addition, the controller 170 may identify x-axis coordinates and y-axis coordinates corresponding to a user's position in the display 180.

The controller 170 may sense a user's gesture based on the images captured by the image capturing unit or the respective signals sensed by the sensor unit, or a combination thereof.

The power supply unit 190 may supply power throughout the home appliance 100. Particularly, the power supply unit 190 may supply power to the controller 170 implemented in the form of a system on chip (SOC), the display 180 for image display, the audio output unit 185 for audio output, and the like.

Specifically, the power supply unit 190 may include a converter for converting AC power into DC power and a DC/DC converter (not shown) for changing a DC power level.

The remote control device 250 transmits a user input to the user input interface 150. To this end, the remote controller 250 may use Bluetooth, radio frequency (RF) communication, infrared (IR) communication, Ultra Wideband (UWB), ZigBee and the like. Furthermore, the remote control device 200 may receive video, audio or data signals output from the user input interface 150, and may display the received signals or may output the same as sound through the remote control device 200.

The block diagram of the home appliance 100 illustrated in FIG. 2 is merely a block diagram for an embodiment of the present disclosure. Components of the block diagram may be integrated, added or omitted according to specifications of the home appliance 100 implemented in practice. That is, two or more components may be combined or one component may be divided into two or more components as needed. Furthermore, a function executed in each block is for description of an embodiment of the present disclosure, and a specific operation or device of each block is not intended to limit the scope of the present disclosure.

Figure 3:
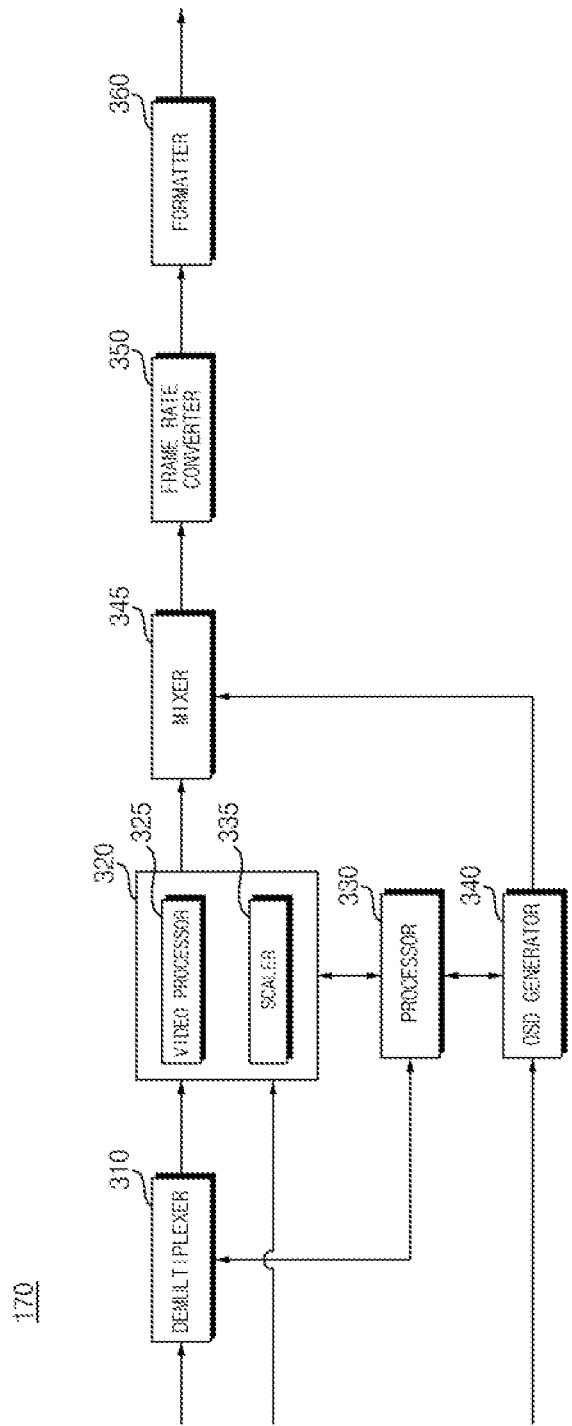
FIG. 3 illustrates an example of an internal block diagram of a controller of FIG. 2.

FIG. 3 is an internal block diagram illustrating the controller of FIG. 2.

Referring to FIG. 3, the controller 170 of the home appliance 100 may include a demultiplexer (DEMUX) 310, a video processor 320, a processor 330, an OSD generator 340, a mixer 345, a frame rate converter 350, and/or a formatter 360. Besides, the controller 170 may further include an audio processor (not shown) and a data processor (not shown).

The DEMUX 310 may demultiplex an input stream. For example, the DEMUX 310 may demultiplex an input MPEG-2 TS into a video signal, an audio signal, and a data signal. The stream signal input to the DEMUX 310 may be a stream signal output from tuner 110, demodulator 120, or the external device interface 130.

The video processor 320 may process the demultiplexed video signal. To this end, the video processor 320 may include a video decoder 325 and a scaler 335.

The video decoder 325 may decode the demultiplexed video signal, and the scaler 335 may scale the resolution of the decoded video signal so that the video signal may be displayed on the display 180.

The video decoder 325 may be provided with decoders having various specifications. For example, the video decoder 325 may include at least one of an MPEG-2 decoder, an H.264 decoder, a 3D image decoder for color images and depth images, a decoder for multi-viewpoint images, and the like.

The processor 330 may control the overall operation of the home appliance 100 or the controller 170. For example, the processor 330 may control the tuner 110 to tune in to a broadcast channel selected by a user or a prestored channel.

In addition, the processor 330 may control the home appliance 100 according to a user command input through the user input interface 150 or an internal program.

Further, the processor 330 may control data transmission with the network interface 135 or the external device interface 130.

Moreover, the processor 330 may control operations of the demultiplexer 310, the video processor 320, the OSD generator 340, and the like in the controller 170.

The OSD generator 340 may generate an OSD signal by itself or according to a user input. For example, based on a user input signal which is input through the input unit 160, the OSD generator 340 may generate a signal for displaying a variety of information in the form of graphic images or texts on the screen of the display 180.

The generated OSD signal may include various data including the user interface screen window, various menu screen windows, widget, icons, etc., of the home appliance 100. In addition, the generated OSD signal may include a 2D object or a 3D object.

Further, the OSD generator 340 may generate a pointer which may be displayed on the display 180, based on a pointing signal input from the remote control device 200.

The OSD generator 340 may include a pointing signal processor (not shown) for generating a pointer. The pointing signal processor (not shown) may be provided separately, instead of being provided in the OSD generator 240.

The mixer 345 may mix the OSD signal, generated by the OSD generator 340, with a video signal processed and decoded by the video processor 320. The mixed video signal may be provided to the frame rate converter 350.

The frame rate converter (FRC) 350 may convert the frame rate of an input video. The FRC 350 may output the frame rate as it is without separately performing frame rate conversion.

The formatter 360 may arrange a left image frame and right image frame of a 3D image produced through frame rate conversion. The formatter 360 may output a synchronization signal Vsync for opening the left eye glass or right eye glass of a 3D viewing apparatus (not shown).

In addition, the formatter 360 may change the format of an input video signal to a format in which the corresponding video may be displayed on the display 180.

Further, the formatter 360 may change the format of a 3D image signal. For example, the formatter 360 may change the format of the 3D image signal to any one of various 3D formats including a side-by-side format, a top/down format, a frame sequential format, an interlaced format, and a checker box format.

Moreover, the formatter 360 may convert a 2D image signal into a 3D image signal. For example, the formatter 360 may detect an edge or a selectable object in a 2D image signal according to a 3D image generation algorithm, and may separate and generate the object according to the detected edge or the selectable object as a 3D image signal. In this case, the generated 3D image signal may be divided into a left image signal L and a right image signal R and may be aligned, as described above.

In addition, although not illustrated herein, a 3D processor (not shown) for 3-dimensional (3D) effect signal processing may be further disposed after the formatter 360. The 3D processor may perform processing by adjusting brightness, tint, and color of an image signal to enhance the 3D effect. For example, signal processing may be performed to make a short distance be in focus and to make a long distance be out of focus, and the like. The function of the 3D processor may be integrated with the formatter 360 or the video processor 320.

The audio processor (not shown) in the controller 170 may voice-process the demultiplexed voice signal. To this end, the audio processor (not shown) may include various decoders.

Further, the audio processor (not shown) in the controller 170 may adjust base, treble, volume, and the like.

The data processor (not shown) in the controller 170 may data-process the demultiplexed data signal. For example, when the demultiplexed data signal is an encoded data signal, the encoded data signal may be decoded. The encoded data signal may be electronic program guide (EPG) information including broadcast information such as start time and finish time of a broadcast program that is broadcast on each channel.

The block diagram of the controller 170 illustrated in FIG. 3 is merely a block diagram of an embodiment of the present disclosure. Components of the block diagram may be integrated, added, or omitted according to the specifications of the controller 170 implemented in practice.

Particularly, each of the frame rate converter 350 and the formatter 360 may be provided separately without being provided in the controller 170, or may be provided separately as one module.

Figure 4A:
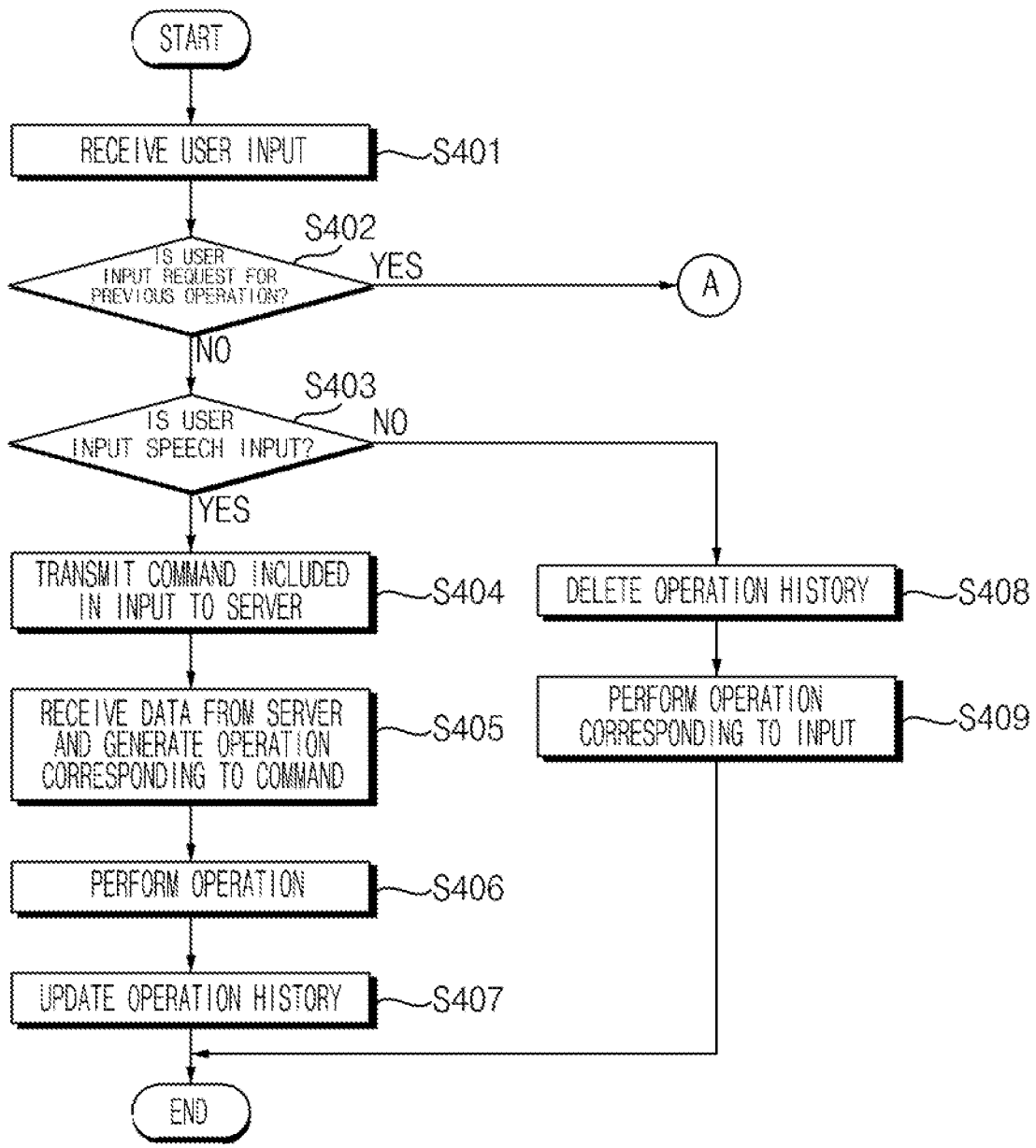
FIGS. 4A and 4B are flowcharts illustrating an operating method of a home appliance according to an embodiment of the present disclosure.
Figure 4B:
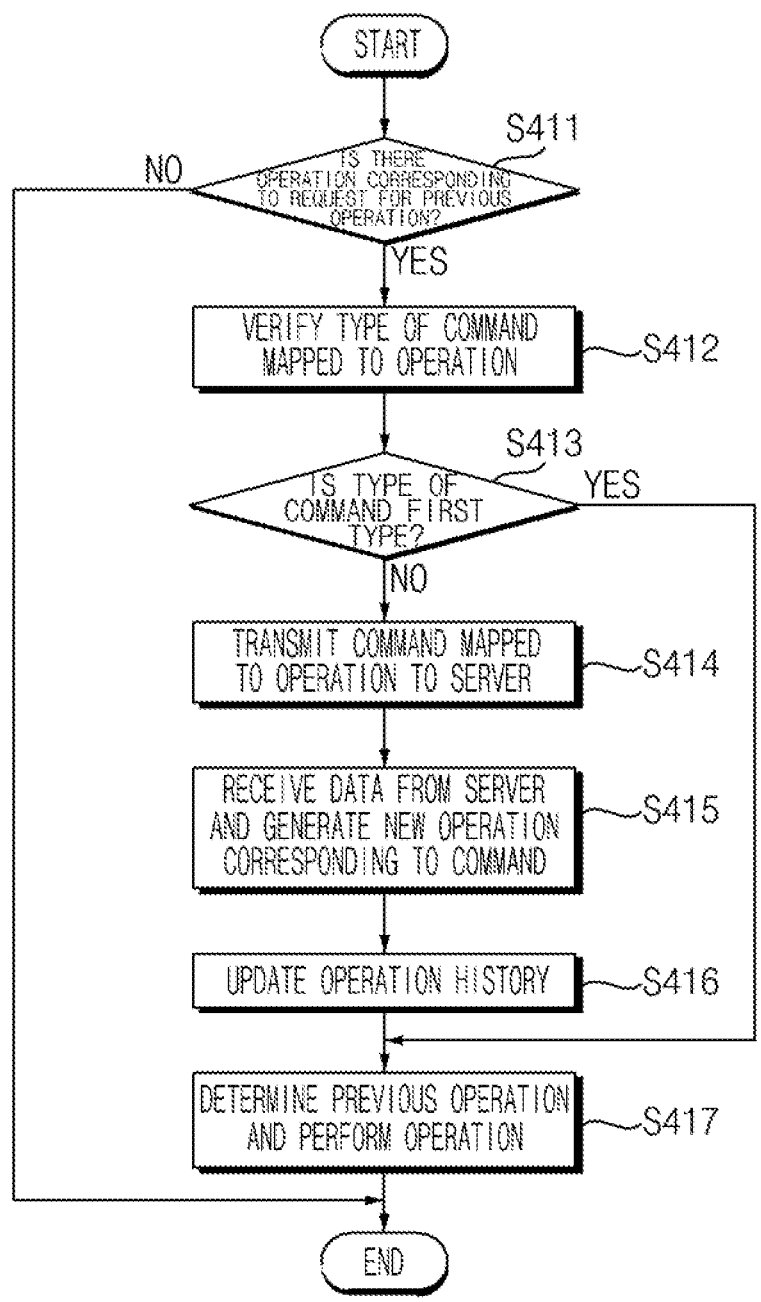

FIGS. 4A and 4B are flowcharts illustrating an operating method of a home appliance according to an embodiment of the present disclosure.

Referring to FIG. 4A, the home appliance 100 may receive a user input in operation S401. For example, the home appliance 100 may receive a signal, corresponding to the user input, from the remote control device 200 through the user input interface 150. For example, the home appliance 100 may receive, as the user input, speech uttered by a user through the microphone included in the input unit 160.

The home appliance 100 may verify whether the received user input is an input for requesting to perform a previous operation in operation S402. For example, upon receiving the signal from the remote control device 200, the home appliance 100 may verify whether the user input, corresponding to the signal received from the remote control device 200, is an input made by a user by pressing a specific button of the remote control device 200 for a previous operation function. For example, upon receiving speech through the microphone of the input unit 160, the home appliance 100 may verify whether the input speech includes a specific word associated with a previous operation function.

If the received user input is not an input for requesting to perform the previous operation, the home appliance 100 may verify whether the received user input is a speech input in operation S403.

If the received user input is a speech input, the home appliance 100 may request the server 300 to transmit data on an operation, corresponding to a command included in the speech input, in operation S404.

For example, the home appliance 100 may perform speech recognition of the input speech and may verify a command included in the input speech, and may transmit the command to the server 300. In this case, by performing speech recognition using natural language processing (NLP), the home appliance 100 may extract words included in the speech and may verify the command included in the input speech. Here, natural language processing (NLP) may refer to technology that mechanically analyzes human languages and makes it into a form that can be understood by electronic devices.

For example, the home appliance 100 may transmit the input speech to the server 300, and the server 300 performs speech recognition of the speech received from the home appliance 100 and may verify a command included in the speech.

Further, the server 300 may determine an operation corresponding to the command included in the speech input and may transmit data on the operation, corresponding to the command, to the home appliance 100. In this case, the server 300 may determine a type of the command included in the speech input and may also transmit data on the command as well as on the type of command.

In operations S405 and S406, the home appliance 100 may receive data on the operation, corresponding to the command, from the server 300 and may generate and perform the operation corresponding to the command based on the received data.

In operation S407, the home appliance 100 may update an operation history. For example, by mapping a command, included in the speech input, to an operation corresponding to the command, the home appliance 100 may add the mapped command to the operation history. In this case, the home appliance 100 may map a type of command onto the operation corresponding to the command.

In addition, if a user input, received immediately before the speech input is received, is an input for requesting to perform a previous operation, the home appliance 100 may delete data on operations, added to the operation history at a later time than an operation performed as the previous operation, from the operation history and may add data, obtained by mapping commands to operations included in the speech input, to the operation history.

If the received user input is not a speech input, the home appliance 100 may delete the operation history included in the database and may perform an operation corresponding to the user input in operations S408 and S409. That is, considering that a user generally uses the same type of input when continuously using the home appliance 100, upon receiving a user input which is not a speech input, the home appliance 100 may delete an operation history of operations performed by speech input, and may generate again an operation history, corresponding to a new type of user input, and may update the operation history.

In addition, referring to FIG. 4B, if the received user input is an input for requesting to perform a previous operation, the home appliance 100 may verify in operation S411 whether there is an operation, corresponding to the request for performing the previous operation, in the operation history. For example, if data on the previous operation is not included in the database of the operation history, or if the home appliance 100 performs operations up to a previous operation, added first to the operation history, according to a previous operation function, the home appliance 100 may determine that the operation, corresponding to the request for performing the previous operation, is present in the operation history.

In this case, if the operation corresponding to the request for performing the previous operation is not present in the operation history, the home appliance 100 may output a message, informing a user that the previous operation is not present in the operation history, through the display 180 and/or the audio output unit 185.

Further, if the operation, corresponding to the request for performing the previous operation, is present in the operation history, the home appliance 100 may verify in operation S412 a type of the command mapped to the operation.

In operation S413, the home appliance 100 may verify whether a type of the command mapped to the operation is a first type in which a result of an operation corresponding to the command remains unchanged over time.

If a type of the command mapped to the operation is not the first type, i.e., if the type is a second type in which a result of the operation corresponding to the command varies over time, the home appliance 100 may transmit the command mapped to the operation to the server 300 and may request the server 300 to transmit data on the operation corresponding to the command in operation S414.

In operation S415, the home appliance 100 may receive data on the operation corresponding to the command from the server 300, and based on the received data, the home appliance 100 may generate a new operation corresponding to the command. In this case, details of the new operation may be different from details of the operation included in the operation history.

In operation S416, the home appliance 100 may update the operation history. For example, the home appliance 100 may update an operation, determined to correspond to the request for performing the previous operation in the operation history, to the new operation generated in operation S415.

In operation S417, if the type of command mapped to the operation is the first type, the home appliance 100 may determine an existing operation, included in the operation history, to be a previous operation and may perform the previous operation. Further, if the type of command mapped to the operation is the second type, the home appliance 100 may determine the new operation, generated in operation S415, to be a previous operation and may perform the previous operation.

FIGS. 5A to 7B are diagrams referred to in explaining an operating method of a home appliance.

Figure 5A:
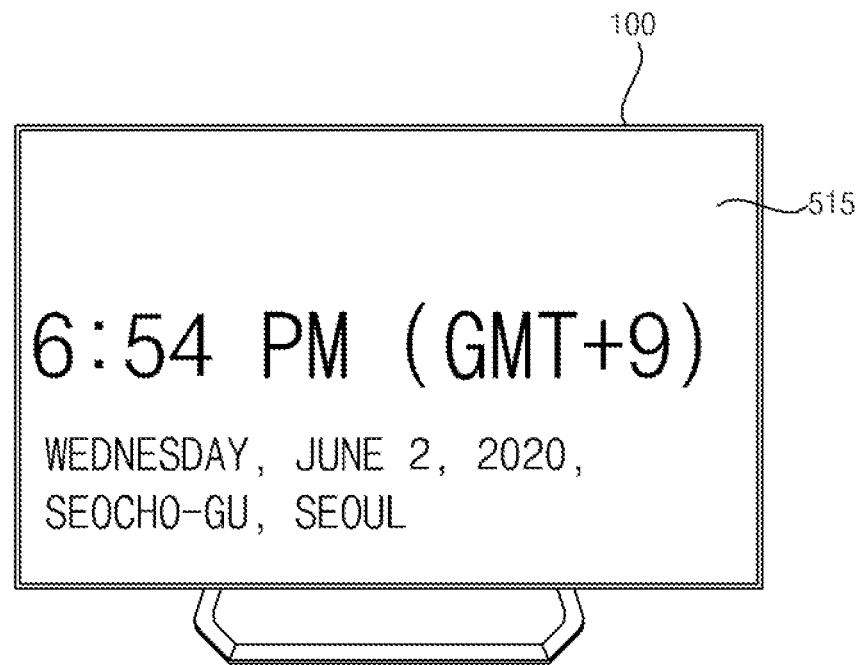
FIGS. 5A to 7B are diagrams referred to in explaining an operating method of a home appliance.
Figure 5A:
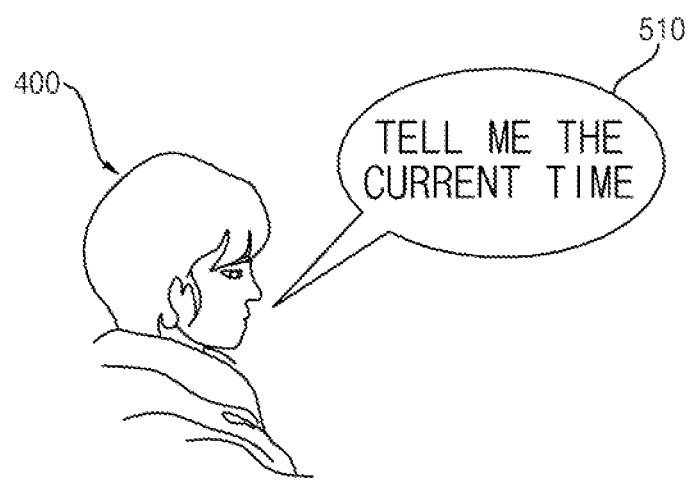

Referring to FIG. 5A, in response to speech 510 uttered by a user 400 to request confirmation of a current time, the home appliance 100 may output a screen 515, containing information on the current time, on the display 180.

In addition, the home appliance 100 may add data on the operation of confirming the current time to the database of the operation history. The data on the operation of confirming the current time may include information on the current time confirmed as a result of the operation, a command for confirming the current time, a type of the command for confirming the current time, and the like.

In this case, the command for confirming the current time may be determined to be the second type, since the details and result of an operation corresponding to the command, i.e., the confirmed current time, may change as the time passes.

Figure 5B:
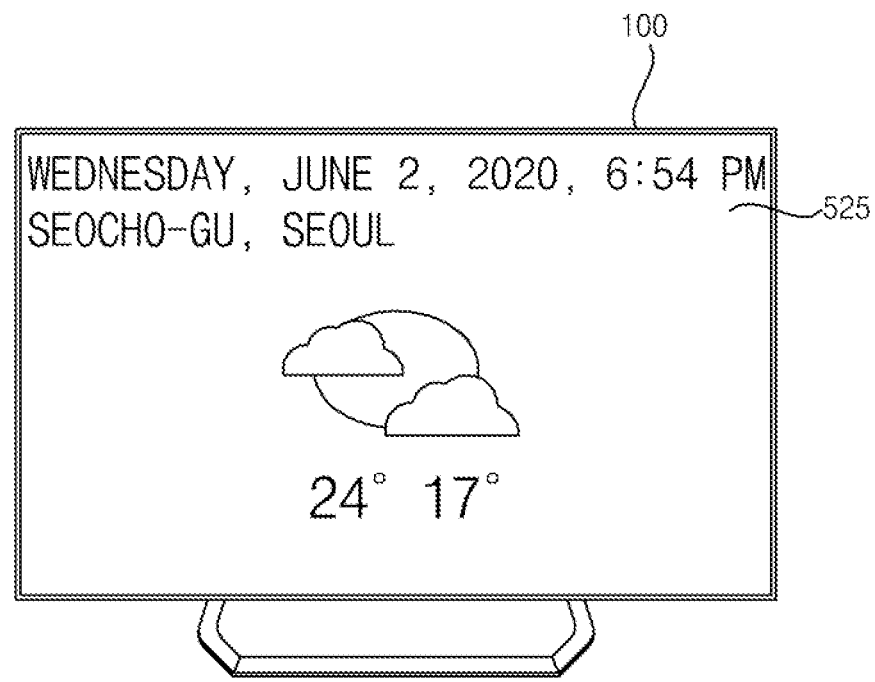
Figure 5B:
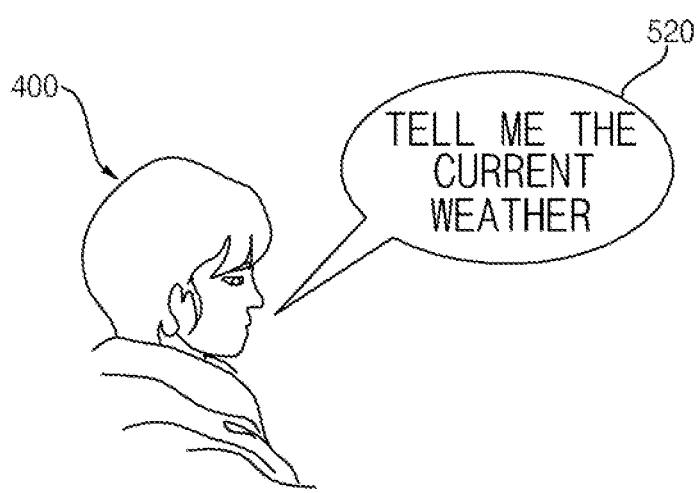
Figure 5C:
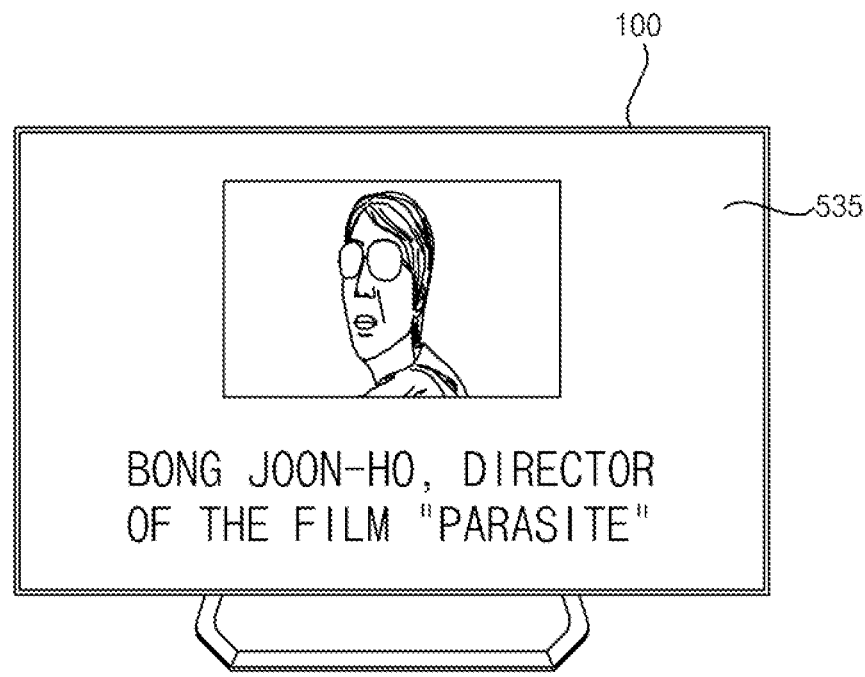
Figure 5C:
Figure 5D:
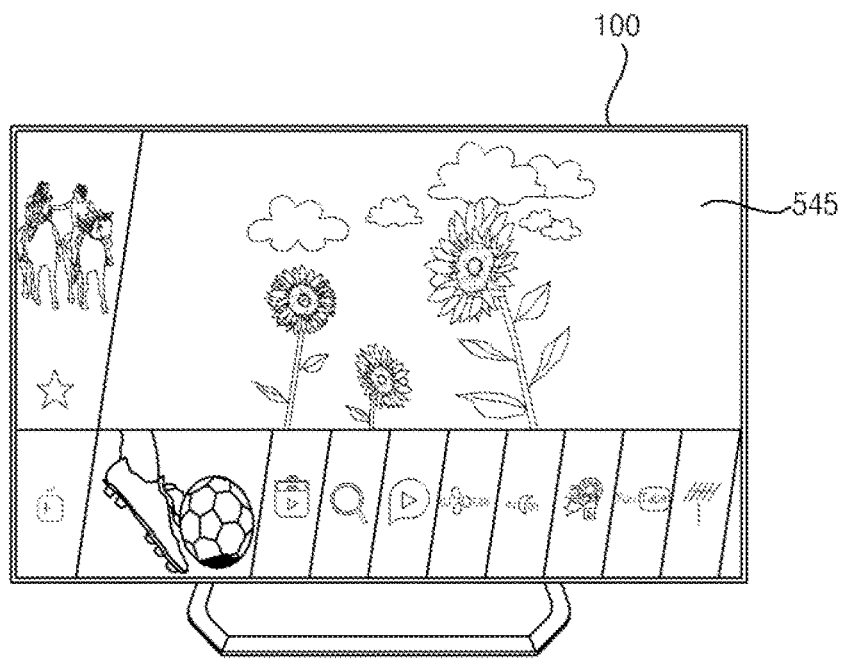
Figure 5D:

Referring to FIGS. 5B to 5D, when the user 400 sequentially utters speech 520 requesting confirmation of a current weather, speech 530 requesting search for a director of a specific film, and speech 540 requesting output of a home screen, the home appliance 100 may sequentially output a screen 525 containing information on the current weather, a screen 535 containing a search result for the director of the specific film, and the home screen 545 on the display 180, in response to the respective speech inputs.

In addition, the home appliance 100 may add data on the operation of confirming the current weather, data on the operation of searching for the director of the specific film, and data on the operation of outputting the home screen to the database of the operation history in the order of performed operations.

Further, each data added to the operation history may include the details and result of each operation, a command corresponding to each operation, a type of the command, and the like.

Figure 6A:
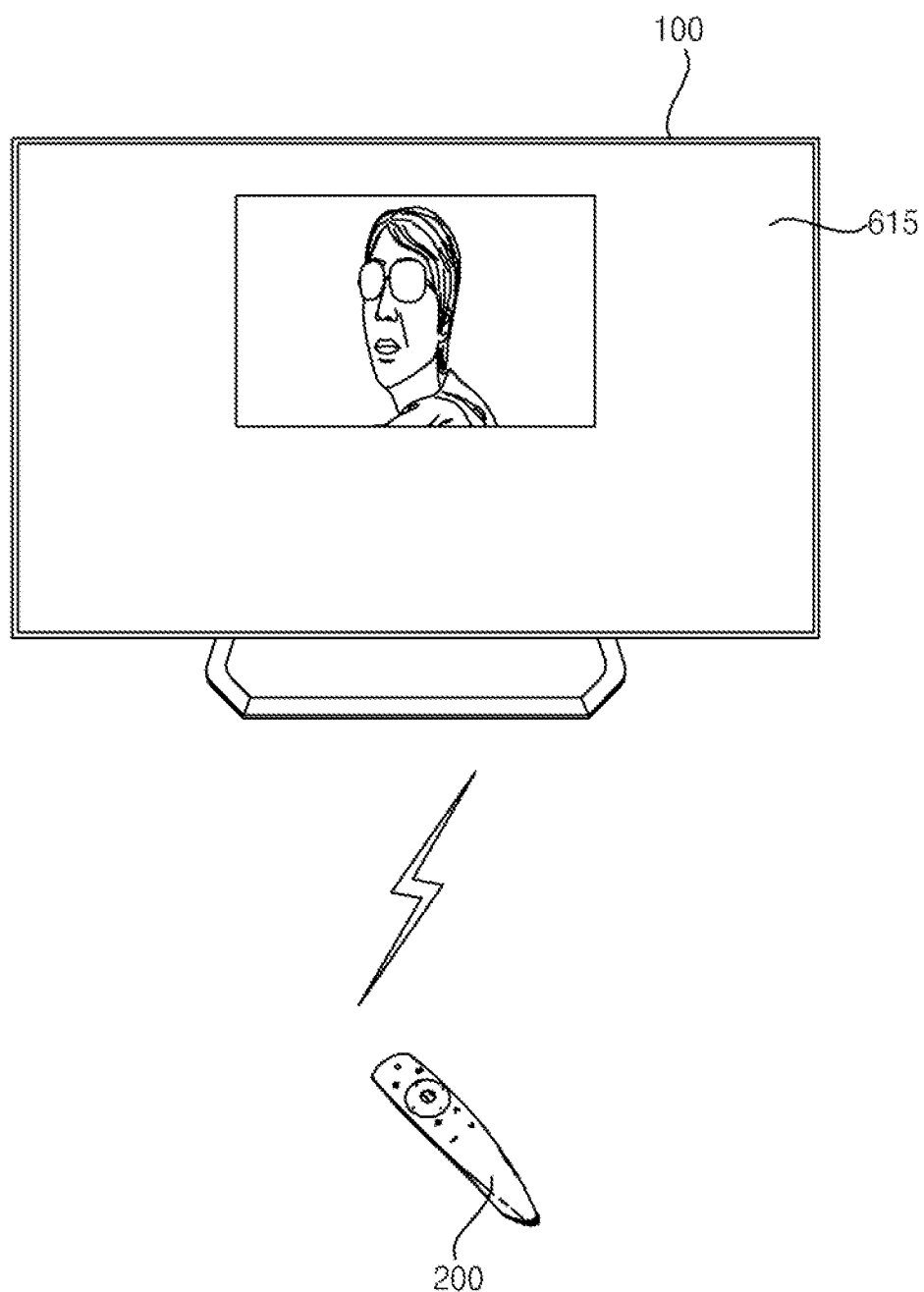

Referring to FIG. 6A, while the home screen 545 is output on the display 180 of the home appliance 100, when a user presses a specific button, provided on the remote control device 200, for executing a previous operation function, the home appliance 100 may determine, as a previous operation, the operation of searching for the director of the specific film, which immediately precedes the operation of outputting the home screen 525.

In this case, the command for searching for the director of the specific film is a first type command in which a search result remains unchanged regardless of a change of time, such that the home appliance 100 may output as it is the search result for the director of the specific film included in the database of the operation history.

Figure 6B:
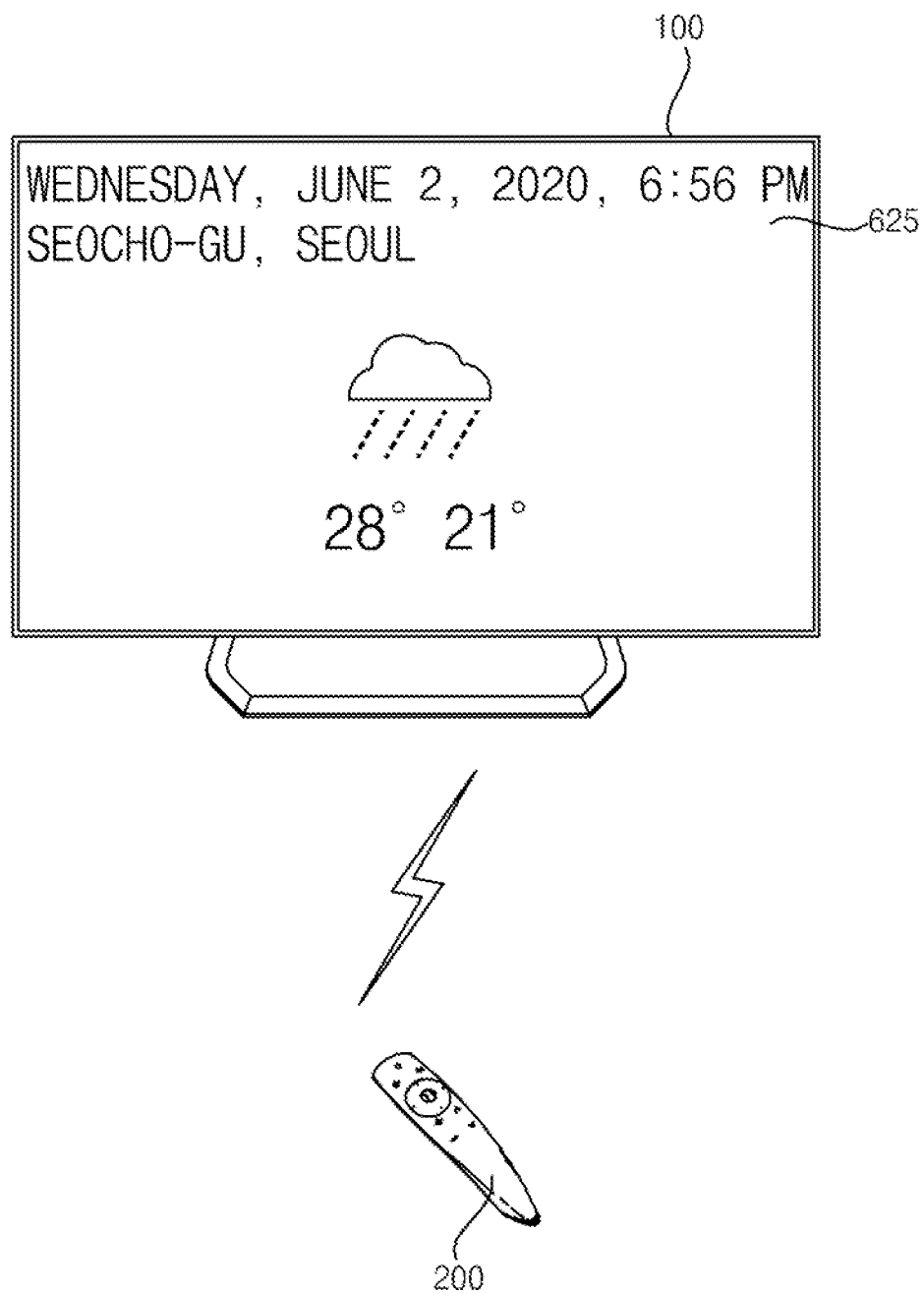

In addition, referring to FIG. 6B, when a user further presses a specific button, provided on the remote control device 200, for executing a previous operation function, the home appliance 100 may determine the operation of confirming the current weather, which immediately precedes the operation of searching for the director of the specific film, to be a previous operation based on the operation history.

In this case, the command for confirming the current weather is a second type command in which a result of an operation corresponding to the command varies over time, such that the home appliance 100 may request the server 300 to transmit data on the current weather, and may output a screen 625 containing information on a reconfirmed current weather based on the data received from the server 300 on the display 180.

Figure 6C:
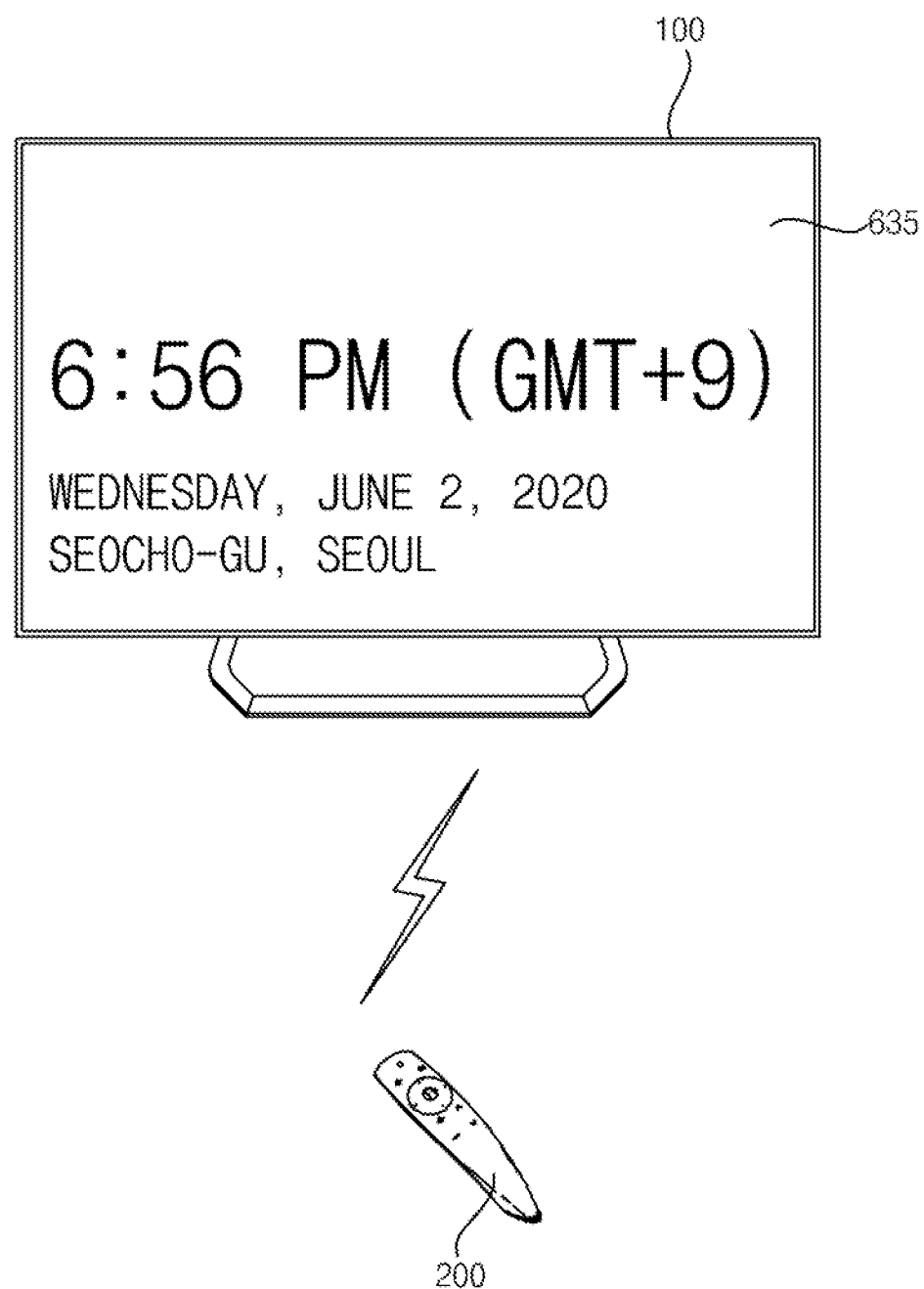

Further, referring to FIG. 6C, when a user further presses again a specific button, provided on the remote control device 200, for executing a previous operation function, the home appliance 100 may determine, as the previous operation, an operation of confirming a current time, which immediately precedes the operation of confirming the current weather.

In this case, the command for confirming the current time is also the second type command in which a result of an operation corresponding to the command varies over time, such that the home appliance 100 may request the server 300 to transmit data on the current time, and may output a screen 635 containing information on the current time reconfirmed based on the data received from the server 300 on the display 180.

Figure 7A:
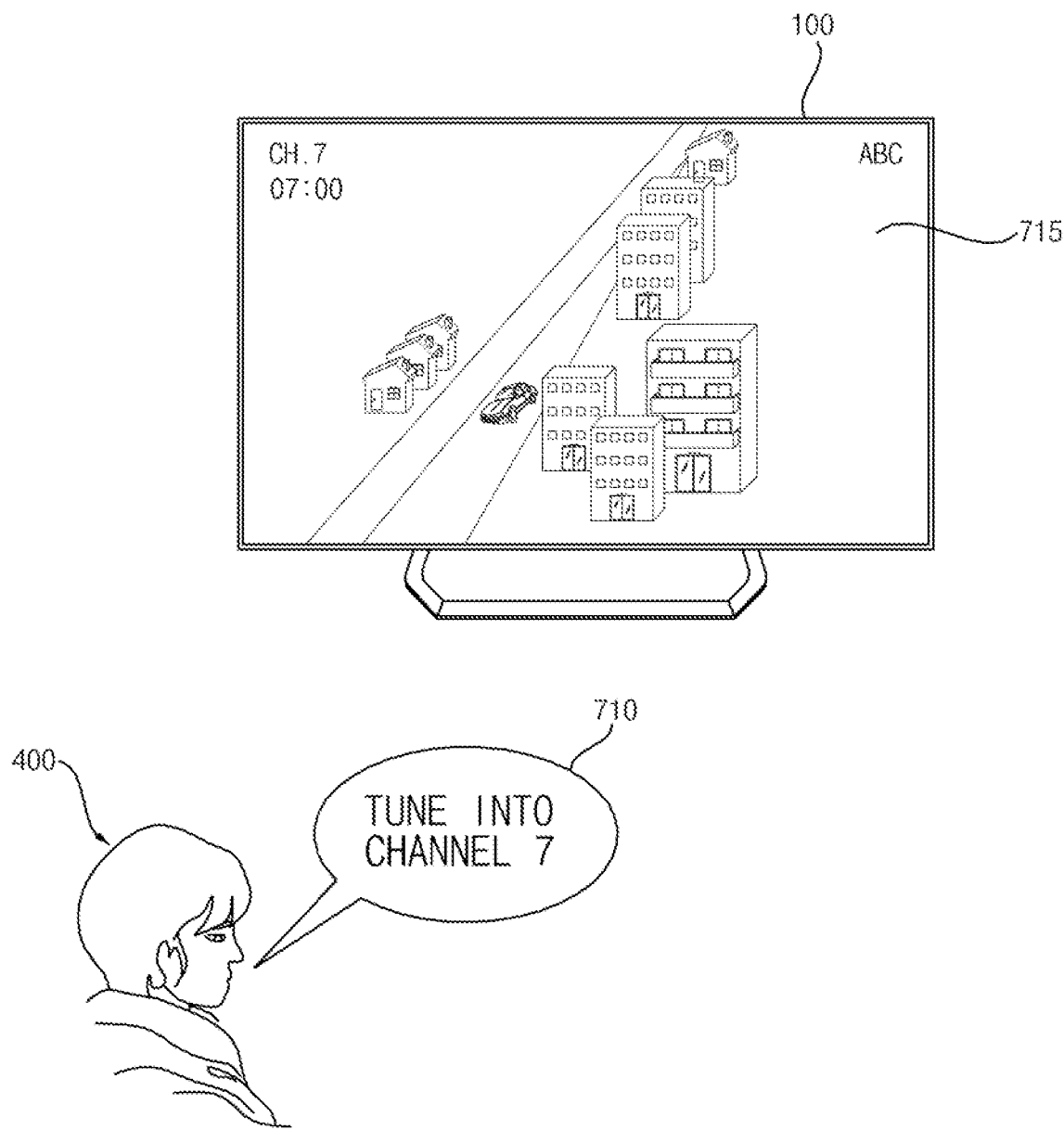

In addition, referring to FIG. 7A, while the screen 635 containing information on the current time is output by the previous operation function, when a user utters speech 710 for selecting a broadcast channel, the home appliance 100 may execute a broadcast-related application to output a screen 715 of the broadcast channel selected by the user on the display 180.

Furthermore, as the speech input is received, which is a type of user input used previously, the home appliance 100 may add data on the operation of outputting the screen of the broadcast channel, selected by the user, to the database of the operation history.

In this case, immediately before receiving the user input for selecting the broadcast channel, the home appliance 100 performs the operation of confirming the current time as a previous operation, such that the home appliance 100 may delete the data on the operation of confirming the current weather, the operation of searching for the director of the specific film, and the operation of outputting the home screen 525 from the database, and then may add data on the operation of outputting the screen of the broadcast channel selected by the user to the database of the operation history.

Figure 7B:
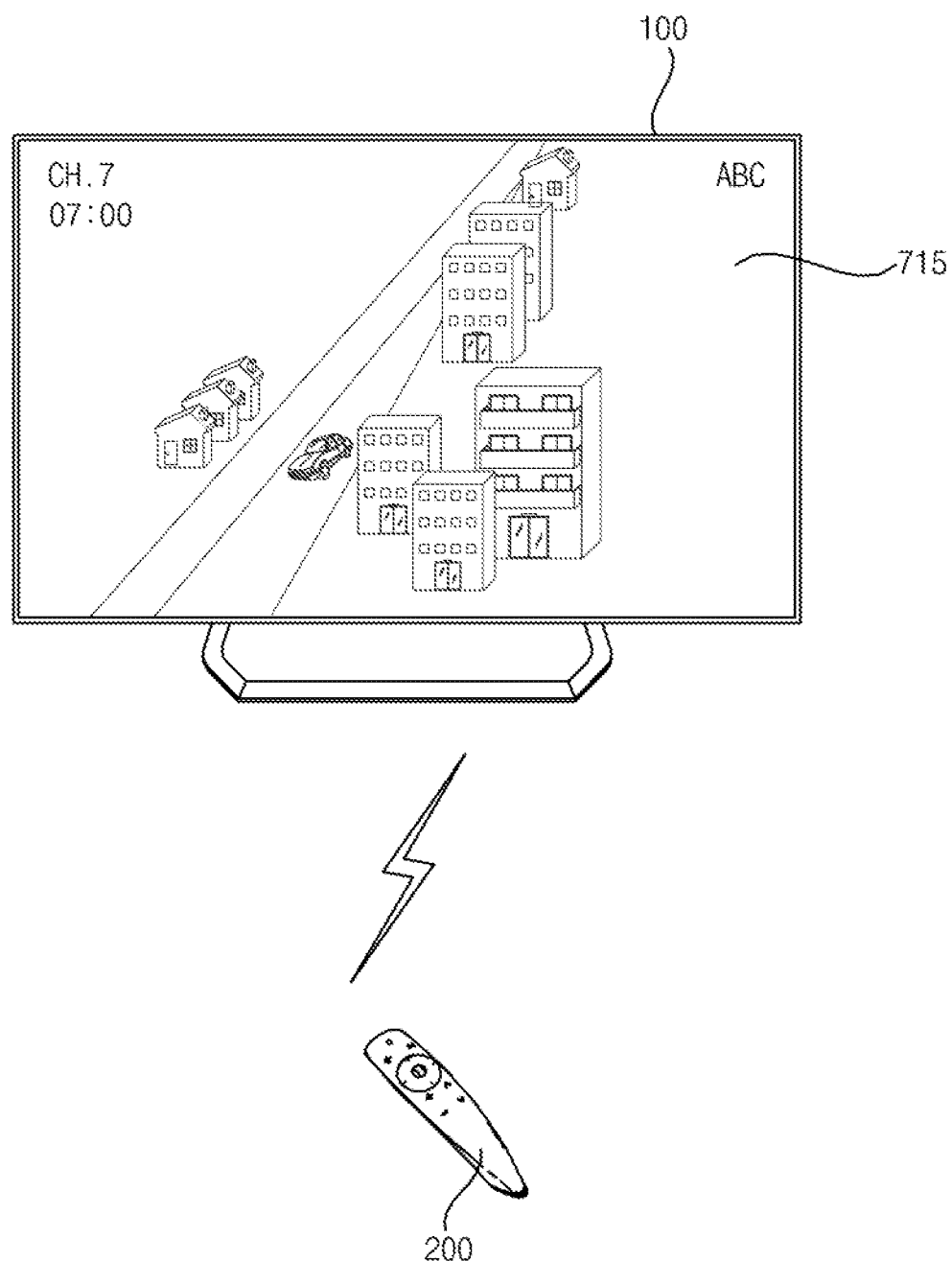

In addition, referring to FIG. 7B, while the screen 635 containing information on the current time is output by the previous operation function, when the user 400 selects a broadcast channel by using a button provided on the remote control device 200, the home appliance 100 may execute a broadcast-related application to output a screen 715 of the broadcast channel selected by the user on the display 180.

In this case, as the received user input is not the speech input, which is a type of user input used previously, the home appliance 100 may delete an operation history of the operations performed by the speech input.

As described above, according to various embodiments of the present disclosure, in the case where a previous operation function is provided based on a history stored in the home appliance 100, it is possible to determine, based on a type of a command stored in the history, whether to use the data stored in the history as it is or to generate a new data, such that a previous operation desired by a user may be performed accurately regardless of lapse of time.

In addition, according to various embodiments of the present disclosure, when an input of the same type is received, an operation performed by the home appliance 100 is added to the history and the history is updated, and when an input of a different type is received, the history is initialized, thereby preventing re-execution of a previous operation which is unexpected to a user.

The accompanying drawings are used to assist in easy understanding of various technical features and it should be understood that the embodiments presented herein are not limited by the accompanying drawings. As such, the present disclosure should be construed to extend to any alterations, equivalents and substitutes falling within the spirit and scope of the present disclosure.

Meanwhile, the home appliance and the operating method thereof according to the embodiments of the present disclosure can be realized as a processor-readable code written on a processor-readable recording medium provided in the home appliance. The processor-readable recording medium may be any type of recording device in which data is stored in a computer-readable manner. Examples of the processor-readable recording medium include a ROM, a RAM, a CD-ROM, a magnetic tape, a floppy disc, an optical data storage, and a carrier wave, e.g., data transmission through the Internet. The processor-readable recording medium can be distributed over a plurality of computer systems connected to a network so that a processor-readable code is written thereto and executed therefrom in a decentralized manner.

While the present disclosure has been shown and described with reference to the preferred embodiments thereof, it should be understood that the present disclosure is not limited to the aforementioned specific embodiments, and various modifications and variations may be made by those skilled in the art without departing from the scope and spirit of the invention as defined by the appended claims, and the modified implementations should not be construed independently of the technical idea or prospect of the present disclosure.

What is claimed is:

1. A home appliance, comprising:
   a display device comprising a broadcast receiver, an external device interface, a network interface, an input unit, a display, an audio output unit, and a power supply unit;
   a user input interface;
   a storage configured to store a database of an operation history; and
   a controller configured to:
   in response to receiving an input from a remote controller, requesting to perform a previous operation through the user input interface, verify whether a first operation, corresponding to the request for performing the previous operation, is present in the operation history;
   in response to there being the first operation, verify a type of a first command, mapped to the first operation, among commands included in the database;
   in response to the type of the first command being a first type of a command in which a result of an operation corresponding to the command remains unchanged over time, determine the first operation to be the previous operation; and
   in response to the type of the first command being a second type of a command in which a result of an operation corresponding to the command varies over time,
   request the server to transmit data on an operation corresponding to the first command through the network interface,
   generate a second operation corresponding to the first command by receiving the data on the operation corresponding to the first command from the server through the network interface, and
   determine the second operation to be the previous operation,
   update the first operation, included in the operation history, to the second operation in response to the second operation being determined to be previous operation.

2. The home appliance of claim 1, wherein the controller is configured to:
   verify whether the first input is a speech input;
   in response to the first input being the speech input, generate a third operation corresponding to a second command included in the first input; and
   mapping the second command to the third operation, and adding the mapped command to the operation history.

3. The home appliance of claim 2, wherein the controller is configured to:
   request the server to transmit data on the operation corresponding to the second command through the network interface; and
   generate the third operation by receiving the data on the operation corresponding to the second command from the server through the network interface.

4. The home appliance of claim 3, wherein the data on the operation corresponding to the second command, which is received from the server, includes a type of the second command,
   wherein the controller is configured to map the type of the second command to the third operation.

5. The home appliance of claim 4, wherein the controller is configured to:
   in response to an input for requesting the previous operation being received immediately before the first input is received, delete data on a command added to the operation history after the data on the first command is added to the operation history; and
   add the data on the second command to the operation history.

6. The home appliance of claim 5, wherein the controller is configured to delete the operation history included in the database in response to the first input not being the speech input.

7. The home appliance of claim 6,
   wherein the controller is configured to output a message, indicating that the previous operation is not present, through the display device in response to there being no first operation.

8. An operating method of a home appliance that includes a display device, the display device comprising a broadcast receiver, an external device interface, a network interface, an input unit, a display, an audio output unit, and a power supply unit, the method performed by a controller of the home appliance and comprising:
   in response to receiving an input from a remote controller, requesting to perform a previous operation, verifying whether a first operation, corresponding to the request for performing the previous operation, is present in a database of an operation history;
   in response to there being the first operation, verifying a type of a first command, mapped to the first operation, among commands included in the database;
   in response to the type of the first command being a first type of a command in which a result of an operation corresponding to the command remains unchanged over time, determining the first operation to be the previous operation; and
   in response to the type of the first command being a second type of a command in which a result of an operation corresponding to the command varies over time,
   requesting the server to transmit data on an operation corresponding to the first command through the network interface,
   generating a second operation corresponding to the first command by receiving the data on the operation corresponding to the first command from the server through the network interface,
   determining determines the second operation to be the previous operation, and
   updating the first operation, included in the operation history, to the second operation in response to the second operation being determined to be previous operation.

9. The method of claim 8, further comprising:
in response to receiving a first input, verifying whether the first input is a speech input;
in response to the first input being the speech input, generating a third operation corresponding to the second command included in the first input; and
by mapping the second command to the third operation, adding the mapped command to the operation history.

10. The method of claim 9, wherein the generating of the third operation comprises:
requesting the server to transmit data on the operation corresponding to the second command; and
generating the third operation by receiving the data on the operation corresponding to the second command from the server.

11. The method of claim 10, wherein the data on the operation corresponding to the second command, which is received from the server, comprises a type of the second command,
wherein the operation of mapping the second command to the third operation and adding the mapped command to the operation history comprises mapping the type of the second command to the third operation.

12. The method of claim 11, further comprising, in response to an input for requesting the previous operation being received immediately before the first input is received, deleting data on a command added to the operation history after the data on the first command is added to the operation history; and
adding the data on the second command to the operation history.

13. The method of claim 12, wherein in response to the first input not being the speech input, deleting the operation history included in the database.

14. The method of claim 13, further comprising, in response to there being no first operation, outputting a message, indicating that the previous operation is not present, through an output unit having at least one of a display and a speaker.

* * * * *